United States Patent [19]

Rösli

[11] 4,357,107
[45] Nov. 2, 1982

[54] FLIGHT TRAJECTORY AND OBSERVATION THEODOLITE

[75] Inventor: Walter Rösli, Zürich, Switzerland

[73] Assignee: Contraves AG, Zürich, Switzerland

[21] Appl. No.: 220,507

[22] Filed: Dec. 29, 1980

[30] Foreign Application Priority Data

Feb. 1, 1980 [CH] Switzerland .................... 830/80

[51] Int. Cl.³ .................. B01C 1/00; F16M 11/12; F16M 11/14
[52] U.S. Cl. ................... 356/147; 248/180; 248/181; 248/183; 356/138
[58] Field of Search ............ 356/138, 142–149; 248/180–181, 183, 661, 663; 343/882; 33/281

[56] References Cited

U.S. PATENT DOCUMENTS 2,354,515 7/1944 Greenwood ................ 248/183
3,001,289 9/1961 Carbonara ................... 356/147

Primary Examiner—William H. Punter
Attorney, Agent, or Firm—Werner W. Kleeman

[57] ABSTRACT

A flight trajectory measuring and observing theodolite wherein the stand portion which essentially comprises a socket element, a stand element, and intermediate element and a leveling stand arranged at the center and the measuring components which essentially contains a yolk element and two housings attached thereto for mounting optical devices, are each constructed as a separate horizontally positionably mountable unit. The stand portion is mounted upon a ring-shaped support element which is non-rotatably connected with the foundation. The connection of the stand portion with the ring-shaped support element is accomplished by means of a foot portion of the leveling stand which is provided at one end with a spherically constructed support surface. Further, the stand portion is radially adjustable and fixable in position in order to horizontally position the stand portion-azimuth rotational axis. The measuring component is mounted by means of a support body provided with a spherically constructed support surface and attached at the yolk element, upon a roller bearing ring arranged at the other end of the leveling stand and can be radially adjusted and fixed in position in order to horizontally position the elevation-tilt axis.

12 Claims, 7 Drawing Figures

FLIGHT TRAJECTORY AND OBSERVATION THEODOLITE

BACKGROUND OF THE INVENTION

The present invention relates to a new and improved construction of a flight trajectory and observation theodolite.

Generally speaking, the flight trajectory and observation theodolite of the present development is of the type comprising a stand portion and a measuring portion having two housings arranged in spaced relationship from one another upon a yolk element, the housings serving to mount optical devices, especially a telescope and a telescopic sight. With such theodolite a stand element of the stand portion together with the measuring component is rotatable about a vertical azimuth-axis of rotation upon a socket element mounted to be nonrotatable upon a foundation. The telescope together with the telescopic sight are mounted to be pivotable about a common horizontal elevation-tilt axis.

With a theodolite of the previously mentioned type, for instance as disclosed in German Pat. No. 1,772,521, it is known to provide an appropriately constructed device arranged essentially in the support column, in order for horizontally positioning the support column and the precision angle measuring device composed of optical devices and supported upon the support column. For the coarse horizontal positioning of the support column there are provided between a support ring of the support column and a base ring mounted upon the foundation three circumferentially distributively arranged wedge elements which can be operated by a threaded spindle drive. The end plane of the support column, constructed for supporting the angle measuring device, likewise can be levelled in the horizontal plane. To this end, the cylindrical jacket of the support column is split at three locations by a lens-shaped gap into two wall halves. These wall halves, under the action of a threaded spindle drive penetrating both wall halves, can be pressed together against the resilient restoring force of the wall halves, so that there is obtained the vertical length change needed for leveling. The accuracy of the horizontal leveling operation of ±1 angle seconds, needed for the exact measurement of the trajectories, partially requires a subsequent, costly manual post-machining of the end plane of the support column, for instance by planing or the like. The described apparatus for the horizontal positioning of the support column by means of the wedges and for leveling the horizontal plane for the angle measuring device by means of the special constructed wall halves which are complicated to fabricate, only has a limited field of application due to the arising deformations.

There is also known from Swiss Pat. No. 488,166 an observation and measuring theodolite which comprises a stand column mounted upon a socket and a support ring mounted upon the stand column in order to support a housing. All of the elements secured and mounted at or in the housing together with the driven housing are rotatable about the vertical central axis of the stand column of the support ring. The horizontal positioning of the stand column as well as leveling of the housing supporting the optical devices has not been disclosed or illustrated in this reference.

Furthermore, an optical testing device has been disclosed in U.S. Pat. No. 3,588,025 wherein there is provided a bearing element within a base body. This bearing element is provided with an inner spherical surface. Within the bearing element there is provided a housing having a corresponding spherical surface and constructed to receive a reflector. The housing together with the reflector or mirror can be adjusted in the bearing element and can be fixed in relation to the base body by means of screws.

SUMMARY OF THE INVENTION

Therefore, with the foregoing in mind it is a primary object of the present invention to provide a new and improved construction of a flight trajectory and observation theodolite which is not associated with the aforementioned drawbacks and limitations of the prior art constructions.

Another and more specific object of the present invention aims at providing a new and improved construction of a theodolite of the previously mentioned type which, while maintaining the required alignment accuracy of ±1 angle seconds affords simplification of the horizontal positioning of the stand portion as well as leveling of the measuring component essentially independent of the stand portion, wherein the fabrication and handling of the theodolite is simplified for such purposes, and wherein the invention can be employed beneficially both in the case of theodolites of smaller and lighter as well as theodolites of larger and more robust construction, for instance employing an alignment stand attached laterally at the stand element and rotatable about the vertical axis.

Yet a further significant object of the present invention aims at providing a new and improved construction of a flight trajectory and observation theodolite which is relatively simple in construction and design, quite economical to manufacture, easy to use, highly reliable in operation, not readily subject to breakdown or malfunction, and requires a minimum of maintenance and servicing.

Now in order to implement these and still further objects of the invention, which will become more readily apparent as the description proceeds, the flight trajectory measuring and observation theodolite of the present development is manifested by the features that:

(a) the stand position essentially consisting of the socket element, the stand element and an intermediate element together with a leveling stand arranged at the center and operatively connected with the stand element forms a component;

(b) the leveling stand is mounted at one end upon a support element nonrotatably connected with the foundation and can be radially adjusted and fixed in position in relation to the support element for aligning the vertical asimuth-axis of rotation;

(c) at the other end of the leveling stand there is provided a roller bearing ring which is rigidly connected for rotation with the intermediate element of the stand portion, this roller bearing ring being mounted essentially upon a base ring which is rigidly connected with the leveling stand; and (d) the measuring component or part constructed as a structural unit along with a support body attached at the yolk element is mounted upon the roller bearing ring and for alignment of the horizontal elevational-tilt axis is radially adjustable and fixable in position in relation to the roller bearing ring.

Due to the separate alignment of the azimuth-rotational axis of the stand portion constructed as a structural unit upon the support element of the foundation as well as the elevation-tilt axis of the measuring component or part likewise constructed as a structural unit upon the leveling stand of the stand portion by carrying out radial displacements there is obtained a correspondingly exact and good controllable change of the position of the azimuth-rotational axis as well as the elevation-tilt axis.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 2:
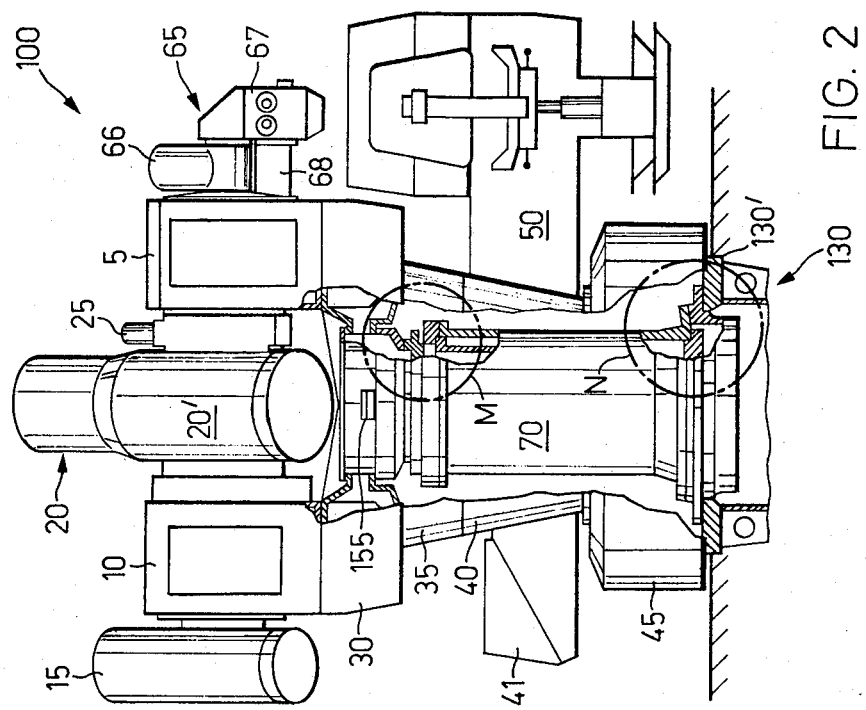
FIG. 2 is a view of the theodolite shown in FIG. 1 in its assembled condition and shown in enlarged scale and partially in sectional view.
Figure 1:
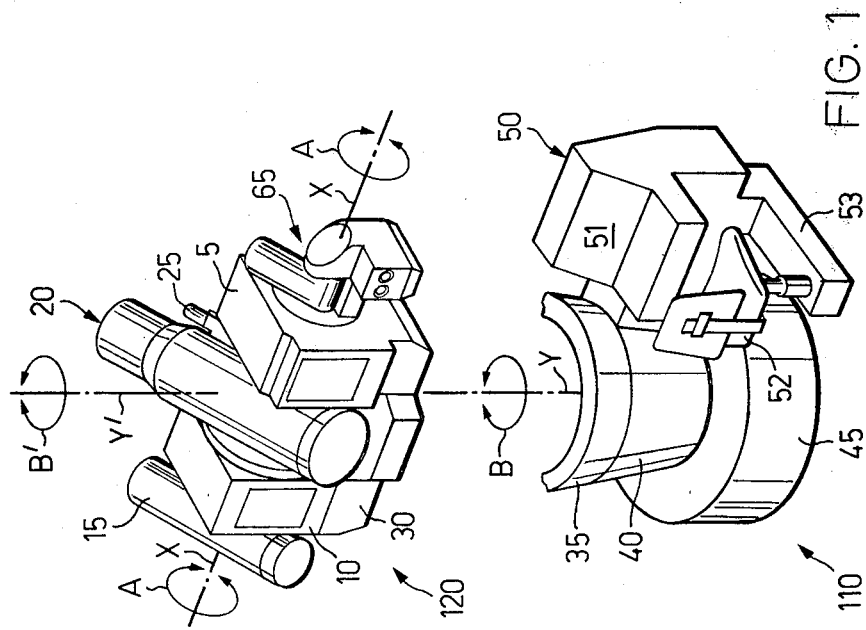
FIG. 1 is a perspective view of a theodolite essentially consisting of a measuring part or component and a stand portion, wherein the measuring part has been illustrated in a raised or exploded position with respect to the stand portion.

Describing now the drawings, in FIG. 1 there is illustrated in perspective view and in FIG. 2 in partially sectional view as well as on an enlarged scale a flight trajectory and observation theodolite 100, especially a recording or motion-picture theodolite. This theodolite 100 which essentially consists of two parts or components, a stand portion 110 and a measuring part or portion 120, has been shown in FIG. 1 in partially disassembled condition, the measuring part or portion 120 is raised from the stand part or portion 110 and in FIG. 2 has been illustrated in its assembled state.

The stand portion 110 encompasses a stationary socket element 45, a stand element 40 and an intermediate element 35. Laterally arranged at the stand element 40 is an alignment stand 50 essentially composed of the operating panel or console 51, a seat 52 and a foot platform 53 and is secured by not particularly illustrated but conventional means. At the side opposite the alignment stand 50 there is provided at the stand element 40, attached thereto by any suitable attachment means, an electronic cabinet or box 41, which only has been particularly shown in FIG. 2. Arranged centrally within the stand portion 110 is a leveling stand 70 constructed as a stand column. This leveling stand 70 is supported at its lower region by an appropriately constructed bearing and support point, shown confined in FIG. 2 within a circle labelled N, upon a foundation 130. At the upper region of the stand 70 there is provided a bearing and support point for the measuring part or portion 120, this bearing and support point being confined within a circle M shown in FIG. 2. The stand element 40 together with the alignment stand 50 is rotatable about a vertical axis Y—Y' in the direction of the arrow B as indicated in FIG. 1, by means of a schematically illustrated drive device or unit 55 arranged preferably in the socket element 45. The measuring part or component 120 encompasses a yolk element 30 having two housing blocks 5 and 10 or equivalent structure arranged in spaced relationship from one another. Between the housing blocks 5 and 10 there is mounted a telescope 20. Arranged laterally at the first housing 5 is a telescopic sight 65. The telescopic sight 65 essentially contains a pivotable objective 66, an occular body 67 and a support body 68 which is flanged at the housing 5. This support body 68 is preferably of substantially U-shaped construction and serves to receive and secure the objective 66. The telescopic sight 65 is appropriately operatively associated with the observer or viewer seated upon the seat 52 of the alignment stand 50.

According to a preferred exemplary embodiment there is laterally provided at the second housing 10 of the measuring part 120 an optical receiver or transmitter 15 for infrared, laser, visible or other radiation. Additionally, there is arranged and secured at the telescope tube 20', at the side confronting the housing 5 in a position which can not be altered with respect to the telescope 20, a television camera 25. The control of the target tracking of the theodolite 100 is achieved by means of the signals received from the television camera 25 or from one of the optical receivers 15. The receiver or transmitter 15, the telescope tube 20' with the TV-camera 25 as well as the objective 66 pivotably mounted between both of the legs of the support body 68 are collectively pivotable about a horizontally dispositioned elevation-tilt axis, preferably about a common horizontal tilt axis X—X. A not particularly illustrated but conventional drive mechanism, arranged within the housing 10, ensures for the elevational movement of the parts 15, 20, 25 and 66 about the tilt or pivot axis X—X in the direction of the double headed arrow A shown in FIG. 1.

In the assembled condition of the theodolite 100 the complete measuring portion or part 120 together with the intermediate element 35, the stand element 40 and the alignment stand 50, as already explained, are rotatable about the common vertical azimuth-rotational axis Y—Y' of the measuring part 120 and the stand portion 110 in the direction of the double-headed arrows B, B' of FIG. 1. The rotational movement B' of the measuring part 120 in relation to the rotational movement B of the stand element 40 together with the alignment stand 50 preferably is accomplished as a synchronous movement.

Figure 3:
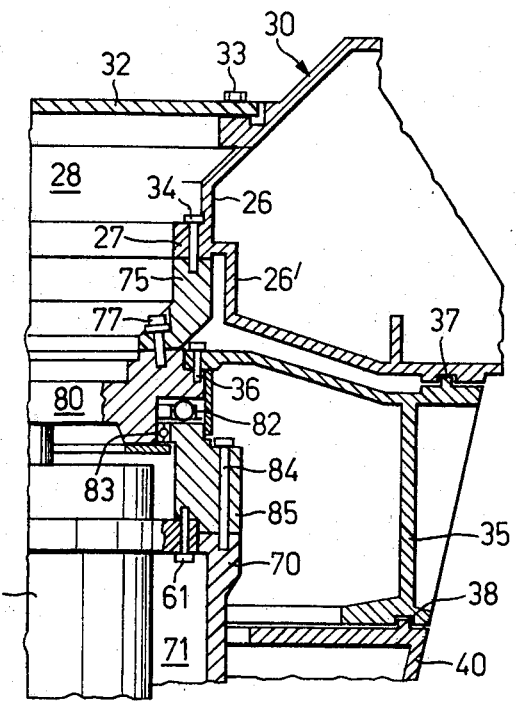
FIG. 3 shows in section the portion of the location M confined within a circle of FIG. 2 and relating to the bearing of the measuring part at the stand portion.

FIG. 3 illustrates as exemplary embodiment the bearing and support point, designated and shown within the circle M of FIG. 2, for the measuring part 120 upon the stand portion 110, the illustration being on an enlarged scale and in sectional view. The bearing and support point M essentially encompasses a support body 75 which supports the yolk element 30 and is non-rotatably connected therewith, a roller bearing ring or race 80 which is rigidly connected for rotation with the intermediate element 35 and a base ring 85 which is rigidly connected with the leveling stand 70.

Continuing, the housing-like constructed yolk element 30 is provided at its upper side for the purpose of receiving both of the housing blocks 5 and 10 with a respective appropriately configured, but not further shown support surface and forms at the inner region a hollow space or compartment 28 which is bounded by a housing wall 26. The hollow compartment or space 28 is closed by a plate 32 which is releasably secured at the yolk element 30 by means of threaded bolts 33 or equivalent fastening devices. A reinforced ring-shaped flange element 27 is provided at the housing wall 26, 26', this flange element 27 serving for the bearing and attachment of the yolk element 30 at the support body 75. The yolk element 30 is secured to the support body 75 by means of threaded bolts or screws 34 distributively arranged about the circumference, these threaded bolts 34 or the like being accessible by means of the hollow compartment or space 28.

The ring-shaped constructed support or carrier body 75, which is connected non-rotatably i.e. fixedly connected for rotation, with the yolk element 30 essentially bears upon the roller bearing ring or race 80 which is connected rigidly for rotation by means of the threaded bolts or screws 36 or the like with the intermediate element 35. Furthermore, by means of fixing screws 77 distributed about the circumference it is possible to operatively interconnect both parts 75 and 80 with one another. Between the roller bearing ring 80 and the base ring 85 there are arranged schematically illustrated ball tracks 82, 83 serving for supporting the radial and axial bearing forces. The ball tracks 82 and 83 are extensively obturated against contamination by suitable lining or covering plates 86, 87 which are attached by any suitable attachment means. At the base ring 85 which is non-rotatably connected by means of the threaded bolts or screws 84 with the leveling stand 70 there is arranged within the cylindrical inner space or compartment 71 of the stand 70 a housing 60 which is attached by the threaded screws or bolts 61 at the base ring 85 and serves to receive a not particularly illustrated but conventional azimuth drive. The azimuth drive which is operatively connected with the roller bearing ring or race 80, as illustrated in FIG. 1, essentially causes the rotational movement B' of the measuring part 120 about the vertical axis Y'. The yolk, intermediate and stand elements, as schematically illustrated in FIG. 3 are each provided with a simple labyrinth seal arrangement 37 and 38.

Figure 3A:
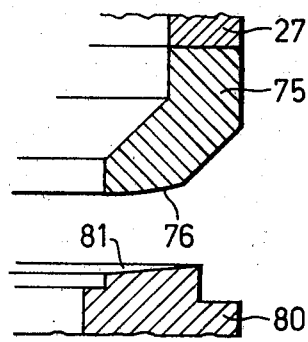
FIG. 3a illustrates on an enlarged scale and in a disassembled state the bearing element of the measuring and stand portion.

FIG. 3a illustrates a respective fragmentary portion of the support body 75 and the roller bearing race or ring 80. There will be recognized the support surface 76 of the support body 75 which is spherically constructed and confronts the roller bearing race or ring 80 and is arranged at a relatively large radius, for instance in the order of magnitude of about 200 cm, located at the vertical axis of rotation Y—Y'. There also will be recognized a corresponding support or contact surface 81 of the roller bearing ring or race 80 which is constructed as an inner cone.

Figure 4:
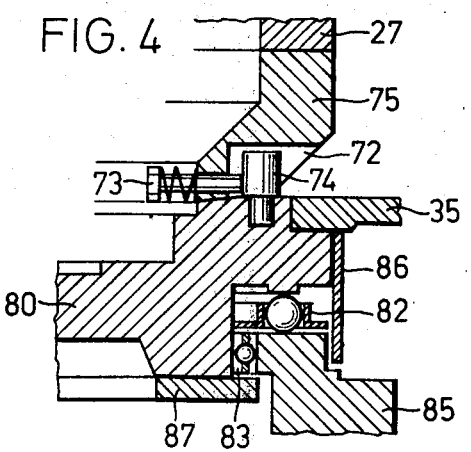
FIG. 4 illustrates the bearing element of FIGS. 3 and 3a showing an adjustment device for the alignment of the measuring part in relation to the stand portion.

FIG. 4 illustrates the mounting as well as a positioning device for the support body 75 upon the roller bearing ring or race 80. There will be recognized the partially illustrated part element 27 of the yolk element 30, the parts 75, 80 and 85, both of the ball tracks 82, 83 and a part element or piece of the intermediate element 35. The positioning device essentially consists of at least three, preferably however four adjustment screws 73, uniformly distributively arranged at the inner circumference of the support body 75. The adjustment screws 73 or equivalent structure are provided with appropriately correlated impact pins 74 or the like which are arranged in recesses 72 of the support body 75 and attached in any suitable fashion at the roller bearing ring 80.

The measuring part or component 120 which is mounted essentially by means of the support or carrier body 75 attached at the yolk element 30 upon the roller bearing ring 80 of the stand portion 110, is aligned in a relatively short amount of time in relation to the stand portion by means of the adjustment screws 73 which are accessible through the hollow space or compartment 28 of the yolk element 30 and are under spring bias, without additional auxiliary means, by radially shifting the support body 75 provided with the spherically configured support surface 76 upon the cone-shaped support or contact surface 81 of the roller bearing ring. This measuring component or part 120 can be therefore appropriately horizontally positioned and fixed in place by the threaded bolts or screws 77. Tests have shown that without any particular expenditure and without the need for any post machining work of the support and contact surfaces by planing or the like, it is possible to obtain an alignment accuracy of ±1 angle seconds.

Figure 5:
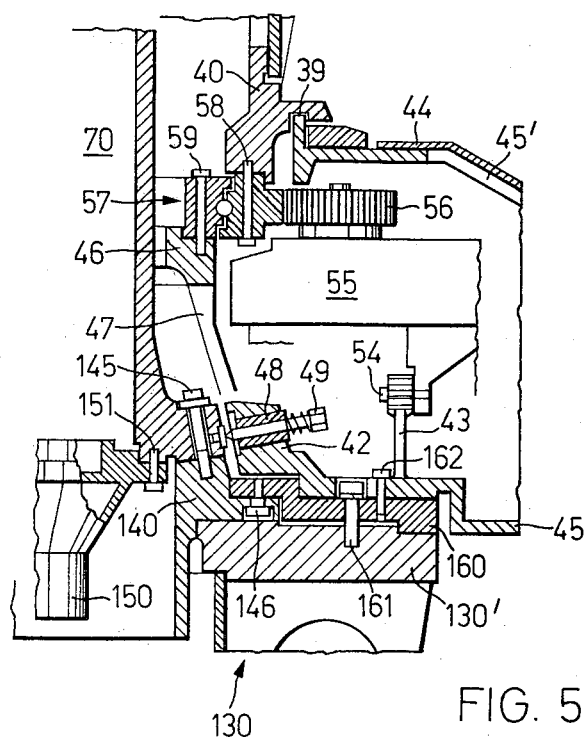
FIG. 5 illustrates a portion in sectional view of the location N confined within the circle designated in FIG. 2 and depicting details of the mounting and adjustment of the stand portion at a foundation.

FIG. 5 illustrates as an exemplary embodiment the bearing and support point of the stand portion 110 upon the foundation 130 in enlarged scale and section. The bearing and support point, as will be recalled, has been shown confined within the circle designated by reference character N in FIG. 2. The enlarged illustration of FIG. 5, which also is in sectional view, enables recognition of the leveling stand 70 which is mounted upon a support element 140 operatively connected with the foundation ring 130', the socket element 45 as well as the drive device or unit 55 which is arranged in the socket element 45 and has been schematically illustrated. The drive device 55 is attached by means of threaded bolts or screws 54 at a web 43 of the socket element 45. The leveling stand 70 is closed at the lower region by a housing 150 which is attached by means of threaded bolts 151 at the stand. The housing 150 additionally serves for centering a not particularly illustrated connection shaft which is operatively connected with the angle measuring device 155 schematically shown in FIG. 2.

The housing-like constructed socket element 45 possesses a substantially ring-shaped contact or support socket 46 which is constructed for receiving a roller or ball bearing 57 or equivalent anti-friction bearing means. The roller bearing 57 is connected with the inner race or ring by means of the threaded screws or bolts 59 at the support socket 46 and with the outer race or ring by means of threaded bolts or screws 58 at the stand element 40. The outer race of the roller bearing 57 and which is provided with not here further shown teeth is operatively connected with a pinion 56 which is driven by the drive device or unit 55. The drive device 55 and the pinion 56 operatively connected by means of the toothed outer race of the ball or roller bearing 57, causes essentially the rotational movement of the stand element 40 with the thereat attached alignment stand 50 about the vertical axis Y in the direction of movement indicated by the double-headed arrow B. The stand element 40 and the socket element 45, as schematically illustrated in FIG. 5, are provided with a simply constructed labyrinth seal arrangement 39.

The contact or support element 140 which is connected by threaded bolts or screws 145 with the leveling stand 70 is rigidly connected by means of a clamping ring 160 with the foundation ring 130' of the foundation 130. The clamping ring 160 is rigidly connected by threaded bolts or screws 146 arranged in distributed fashion at the circumference with the support or contact element 140 and by means of the threaded bolts or screws 161 with the foundation ring 130'. The socket element 45 is rigidly connected with the clamping ring 160 by means of threaded bolts or screws 162 which are circumferentially distributively arranged.

Figure 5A:
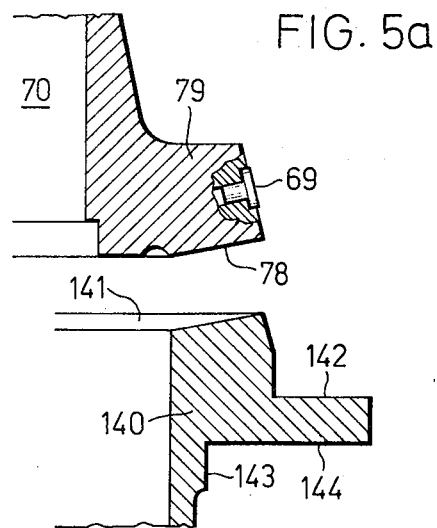
FIG. 5a illustrates the bearing elements of the bearing or mounting arrangement of FIG. 5 shown on an enlarged scale and in a disassembled state.

FIG. 5a illustrates a respective partial portion of the leveling stand 70 constructed at its lower region as a base or foot portion 79 as well as a partial portion of the preferably ring-shaped contact or support element 140 in enlarged view. The base or foot portion 79 is provided at the side confronting the support or contact element 140 with a spherically configured support surface 78, which likewise has a relatively large, in the order of magnitude of about 200 cm, radius located upon the vertical axis Y. The support or contact element 140 is provided at the side confronting the support surface 78 of the foot or base portion 79 with a corresponding contact or support surface 141 constructed as an inner cone. Additionally, the support or contact element 140 is provided with a support surface 142 for the clamping ring 160 and with a substantially ring-shaped centering surface 143 correlated to the foundation ring 130' and a support surface 144.

As further illustrated in FIG. 5, at the lower region of the socket element 45 there are provided at least three uniformly, but preferably however four uniformly circumferentially distributively arranged bearing eyelets or bosses 42. Within each bearing eyelet 42 there is arranged and secured a respective bushing or sleeve 48. The bushing 48 serves for receiving a related adjustment bolt or screw 49, by means of which it is possible to align the leveling stand 70 mounted upon the support surface 141 of the support element 140. The adjustment screw or bolt 49 or equivalent structure bears upon an appropriately correlated support element or portion 69 (FIGS. 5 and 5a) which is attached laterally in any suitable fashion at the base or foot portion 79.

The leveling stand 70 of the stand portion 110 which is mounted by means of the support surface 78 of the foot or base portion 79 upon the support surface 141 of the support element 140 is aligned in relation to the foundation 130 and the support element 140 by means of the adjustment screws or bolts 49 which are accessible by means of the openings 45' provided at the socket element 45 and which are under spring bias. This adjustment is accomplished by radially displacing the foot portion 79, provided with the spherically constructed support surface 78, upon the conical-shaped support or contact surface 141 of the support element 140 and apart from such alignment the leveling stand 70 of the stand portion 110 can be horizontally positioned and fixed at the support element 140 by means of the threaded bolts 145 which are accessible through the openings 47.

The drive device 55, the screws or threaded bolts 54, 161, 162, 145 and 58 and the adjustment screws 49 are accessible by means of the opening 45' and 47 arranged at the socket element 45. The openings 45' are closed by the cover elements 44 attached by any suitable fixing means at the socket element 45.

While there are shown and described present preferred embodiments of the invention, it is to be distinctly understood that the invention is not limited thereto, but may be otherwise embodied and practiced within the scope of the following claims. ACCORDINGLY,

What I claim is:

1. In a flight trajectory measuring and observing theodolite composed of a stand portion and a measuring portion containing two housings arranged in spaced relationship from one another upon a yolk element and serving for the mounting of optical devices, especially a telescope and a telescopic sight, a stand element of the stand portion together with the measuring portion being rotatable in relation to a socket element which is non-rotatably mounted at a foundation about a vertical azimuth rotational axis and the telescope along with the telescopic sight are pivotably mounted about a common horizontal elevation tilt axis, the improvement which comprises:
   the stand portion being composed essentially of the socket element, the stand element and an intermediate element;
   a leveling stand operatively connected with the stand portion and arranged at the center thereof;
   said stand portion and said leveling stand forming a structural unit;
   said leveling stand being mounted at one end upon a support element non-rotatably connected at the foundation and being radially adjustable and fixable in position for aligning the vertical azimuth rotational axis in relation to the support element;
   the other end of the leveling stand having mounted thereat a roller bearing ring which is rigidly connected for rotation with the intermediate element of the stand portion;
   said roller bearing ring essentially being mounted at a base ring rigidly connected with the leveling stand; and
   the measuring portion constructed as said structural unit being mounted by means of a support body attached to the yolk element upon the roller bearing ring and for aligning the horizontal elevation tilt axis being radially adjustable and fixable in position in relation to the roller bearing ring.

2. The theodolite as defined in claim 1, wherein:
   said leveling stand being provided at one end thereof constructed as a foot portion with a substantially spherical support surface and operatively associated with the support element.

3. The theodolite as defined in claim 2, further including:
   a support surface provided for said support element; and
   said support surface being operatively associated with a support surface of the leveling stand.

4. The theodolite as defined in claim 3, wherein:
   said support surface of said support element comprises an internal conical support surface.

5. The theodolite as defined in claim 1, further including:
   at least three bearing eyelets essentially uniformly distributively arranged at the circumference and provided in the stationary socket element;
   adjustment means provided for said bearing eyelets;
   each of the adjustment means acting upon a foot portion of said leveling stand; and said adjustment means serving for the radial adjustment of the leveling stand.

6. The theodolite as defined in claim 5, wherein:
four of said bearing eyelets are provided.

7. The theodolite as defined in claim 1, wherein:
said support body attached at the yolk element of the measuring portion is substantially ring-shaped; and
said ring-shaped support body being provided with a substantially spherical support surface operatively associated with the roller bearing ring.

8. The theodolite as defined in claim 7, wherein:
the roller bearing ring arranged at the other end of the leveling stand possesses a support surface operatively associated with a support surface of the support body.

9. The theodolite as defined in claim 8, wherein:
said support surface comprises an internal conical support surface.

10. The theodolite as defined in claim 7, wherein:
at least three adjustment means are provided for the support body;
said adjustment means being uniformly circumferentially distributively arranged; and
impact elements provided for said roller bearing ring and against which bear said adjustment means.

11. The theodolite as defined in claim 10, wherein:
there are provided at least four of said adjustment means.

12. The theodolite as defined in claim 10, wherein:
said adjustment means comprise adjustment screws.

* * * * *